United States Patent
Tang et al.

(10) Patent No.: US 11,254,050 B2
(45) Date of Patent: Feb. 22, 2022

(54) 3D PRINTING BOTTOM PLATE SYSTEM AND METHOD OF REPLACING 3D PRINTING BASE PLATE

(71) Applicant: Beijing Tiertime Technology Co., Ltd., Beijing (CN)

(72) Inventors: Guolin Tang, Beijing (CN); Ge Guo, Beijing (CN); Tiezhuo Wang, Beijing (CN); Mingxi Gao, Beijing (CN)

(73) Assignee: BEIJING TIERTIME TECHNOLOGY CO., LTD., Beijing (CN)

(*) Notice: Subject to any disclaimer, the term of this patent is extended or adjusted under 35 U.S.C. 154(b) by 267 days.

(21) Appl. No.: 16/541,738

(22) Filed: Aug. 15, 2019

(65) Prior Publication Data

US 2019/0366632 A1   Dec. 5, 2019

Related U.S. Application Data

(63) Continuation-in-part of application No. PCT/CN2017/092654, filed on Jul. 12, 2017.

(30) Foreign Application Priority Data

Mar. 20, 2017 (CN) .......................... 201710165469.4

(51) Int. Cl.
*B29C 64/245* (2017.01)
*B33Y 30/00* (2015.01)
(Continued)

(52) U.S. Cl.
CPC .......... *B29C 64/245* (2017.08); *B29C 64/236* (2017.08); *B29C 64/393* (2017.08); *B33Y 30/00* (2014.12); *B33Y 50/02* (2014.12)

(58) Field of Classification Search
CPC ... B29C 64/245; B29C 64/393; B29C 64/236; B33Y 30/00; B33Y 50/02
(Continued)

(56) References Cited

U.S. PATENT DOCUMENTS

| 2004/0003738 A1 | 1/2004 | Imiolek et al. |
| 2007/0077323 A1* | 4/2007 | Stonesmith ........... B29C 64/135 |
| | | 425/174.4 |
| 2016/0370792 A1 | 12/2016 | Jacobs et al. |

FOREIGN PATENT DOCUMENTS

| CN | 204749293 | 11/2015 |
| CN | 105437552 | 3/2016 |

(Continued)

OTHER PUBLICATIONS

Yang, CN105437552A, Mar. 30, 2016, machine translation Chinese to English (Year: 2016).*
(Continued)

*Primary Examiner* — Joseph S Del Sole
*Assistant Examiner* — Lawrence D. Hohenbrink, Jr.
(74) *Attorney, Agent, or Firm* — Hogan Lovells US LLP (57) ABSTRACT

The present disclosure provides a 3D printing bottom plate system, including a printing bottom plate and a storage unit for base plates, the printing bottom plate is movable in a direction towards or away from the storage unit for base plates; in the process of the printing bottom plate moving towards the storage unit for base plates, the lowermost one of base plates stored in a stacked manner in the storage unit for base plates slides onto the printing bottom plate; and in the process of the printing bottom plate moving away from the storage unit for base plates, the base plate slid onto the printing bottom plate is driven to a preset working position by the printing bottom plate.

20 Claims, 8 Drawing Sheets

(51) Int. Cl.
  *B33Y 50/02* (2015.01)
  *B29C 64/393* (2017.01)
  *B29C 64/236* (2017.01)
(58) Field of Classification Search
  USPC .................................................. 425/140, 375
  See application file for complete search history.

(56) References Cited

FOREIGN PATENT DOCUMENTS

| CN | 105437552 A | * | 3/2016 |
|----|-------------|---|--------|
| CN | 205651669 |  | 10/2016 |
| CN | 106881858 |  | 6/2017 |

OTHER PUBLICATIONS

International Search Report issued in PCT Application No. PCT/CN2017/092654 dated Nov. 20, 2017.

* cited by examiner

3D PRINTING BOTTOM PLATE SYSTEM AND METHOD OF REPLACING 3D PRINTING BASE PLATE

CROSS-REFERENCE TO RELATED APPLICATIONS

The present application is a continuation-in-part application based on PCT Application No. PCT/CN2017/092654, filed on Jul. 12, 2017 and entitled "3D Printing Bottom Plate System and Method of Replacing 3D Printing Contact Plate", the contents of which is incorporated herein by reference in its entirety.

TECHNICAL FIELD

The present disclosure relates to the technical field of 3D printing, and particularly to a 3D printing bottom plate system and a method of replacing a 3D printing base plate.

BACKGROUND ART

The 3D printing technology (or rapid prototyping technology) is rapidly developed because of its numerous advantages over the existing subtraction processing technology. The 3D printing technology based on fused deposition modeling technology is mainly implemented as follows, i.e., the solid 3D printing supplies are heated to a molten state by a printhead, and the materials in the molten state are extruded through the printhead, and printed and molded by being stacked layer by layer on a printing bottom plate to finally form a printed model.

In the prior art, after a 3D printer completes one printing, it is necessary to manually remove the printed model from the 3D printer and clear the printing bottom plate or replace a new printing bottom plate before the next (round of) printing molding work is performed. When there is a need for bulk printing and the time for printing molding is relatively long, real-time manual monitoring cannot be ensured, and the base plate (contact plate, build plate) on the printing bottom plate cannot be replaced in time for continuing the printing, which thereby greatly increases the total time of continuous printing molding, and therefore reduces the efficiency of 3D printing. This is a technical problem to be solved urgently for those skilled in the art.

SUMMARY

An embodiment of the present disclosure provides a 3D printing bottom plate system, comprising a printing bottom plate and a storage unit for base plates (base plate storage unit), wherein the printing bottom plate is movable in a direction towards or away from the storage unit for base plates;

in the process of the printing bottom plate moving towards the storage unit for base plates, the lowermost one of base plates stored in a stacked manner in the storage unit for base plates slides onto the printing bottom plate; and in the process of the printing bottom plate moving away from the storage unit for base plates, the base plate slid onto the printing bottom plate is driven to a preset working position by the printing bottom plate.

An embodiment of the present disclosure provides a method of replacing a 3D printing base plate, which is applicable to the above 3D printing bottom plate system, the method comprising steps of:

controlling a first slider to drive a printing bottom plate to move by a first length $L_1$ along a sliding rail (slide rail) in a direction towards a storage unit for base plates, and then move back in a direction away from the storage unit for base plates; and a control unit, in the process of the first slider moving back in the direction away from the storage unit for base plates, in a case of detecting a signal which is generated by a second limit switch when a sensor stopper block (stopping block) is pressed down, controlling the first slider to move along the sliding rail by a third length $L_3$ in the direction towards the storage unit for base plates, then controlling the first slider to move along the sliding rail in the direction away from the storage unit for base plates so that the first slider triggers a first limit switch, and the control unit controlling, according to a signal of the first limit switch, the first slider to drive the printing bottom plate to move to a preset working position.

An embodiment of the present disclosure further provides a method of replacing a 3D printing base plate, which is applicable to a 3D printing bottom plate system comprising a printing bottom plate and a storage unit for base plates, the method comprising:

controlling the printing bottom plate to move in a direction towards the storage unit for base plates so that the lowermost one of base plates stored in the storage unit for base plates slides onto the printing bottom plate; and controlling the printing bottom plate to move in a direction away from the storage unit for base plates so that the base plate slid onto the printing bottom plate is driven to a preset working position by the printing bottom plate.

Description of the reference signs: base 1; side plate 11; left stop plate 12; right stop plate 13; sliding mechanism 2; sliding rail 21; first slider 22; second slider 23; lead screw 24; motor 25; printing bottom plate 3; bottom plate support 31; stopping member 32; support plate 33; leveling nut 34; aluminum substrate 35; storage unit 4 for base plate; storage box 41; third opening 411; first opening 412; stopper block 42; spring rod 43; first support member 44; second support member 45; third support member 46; feed rod 47; corner fittings 26, 48; control unit 5; sensor stopper block 51; and base plate 6.

DETAILED DESCRIPTION OF EMBODIMENTS

In the description of the present disclosure, it should be understood that unless otherwise explicitly specified and defined, the terms such as "first" and "second" merely serve the purpose of description and cannot be understood as an indication or implication of relative importance, or an implication of the number of the technical features referred to. Therefore, the features defined with the terms "first" and "second" may explicitly or implicitly indicate that one or more such features are included.

The orientation or position relations denoted by terms such as "upper", "lower", "front", "rear", "left", "right", "top", "bottom", "inner", "outer", "center", "vertical" and "horizontal" are based on the orientation or position relations indicated by the accompanying drawings, which only serves to facilitate describing the present disclosure and simplify the description, rather than indicating or implying that the device or element referred to must have a particular orientation, or is constructed and operated in a particular orientation, and therefore cannot be construed as a limitation on the present disclosure.

The first feature being "on" or "under" the second feature may include the case that the first feature and the second feature being in direct contact, or the case that the first feature and the second feature in contact with each other via another feature therebetween instead of not being in direct contact, but. Also, the first feature being "on", "above" or "over" the second feature includes the case that the first feature being right above or being obliquely above the second feature, or merely indicates the level of the first feature being higher than that of the second feature. The first feature being "under", "below" or "beneath" the second feature includes the case that the first feature being directly below or being obliquely below the second feature, or merely indicates the level of the first feature being lower than that of the second feature.

Terms such as "mount", "connect", "fix" and "fixedly connect" shall be understood in broad sense, which may, for example, refer to fixed connection, detachable connection or integral connection; may refer to mechanical connection or electrical connection; may refer to direct connection or indirect connection by means of an intermediate medium; and may refer to internal communication between two elements. A person of ordinary skills in the art could understand the specific meaning of the terms in the present disclosure according to specific situations.

In order that a person skilled in the art can better understand the solutions of the present disclosure, further detailed description is made on the present disclosure below in connection with the accompanying drawings and the detailed description of embodiments.

Referring to FIG. 1 to FIG. 7, an embodiment of the present disclosure provides a 3D printing bottom plate system, comprising a base 1, a sliding mechanism 2, a printing bottom plate 3 and a storage unit 4 for base plates; wherein the sliding mechanism 2 comprises a sliding rail 21 fixed, in a left-right orientation, to the base 1; a first slider 22 and a second slider 23 which are slidably and sequentially mounted on the sliding rail 21, the first slider being to the left to the second slider; and a driving device configured to drive the sliders; the printing bottom plate 3 is fixedly mounted on the first slider 22, the printing bottom plate 3 comprises a bottom plate support 31, sliding grooves (not denoted in the figures) are symmetrically disposed at front side and rear side of the bottom plate support 31, such that a base plate 6 can move in the direction of the sliding grooves, and the sliding grooves are each provided with a stopping member 32 for fixing the base plates 6; and the storage unit 4 for base plates is fixedly mounted on the second slider 23 and the storage unit 4 for base plates comprises a storage box 41 and a stopper block (stopping block) 42, the left bottom of the storage box 41 is provided with a first opening 412 for access of the base plates 6, the right bottom of the storage box is provided with a second opening (not denoted in the figures), and a bottom plate of the storage box 41 is provided, in the left-right orientation, with a third opening 411 communicating with the second opening; and the stopper block 42 is fixedly connected at the right end of the base 1, and the level of the top of the stopper block 42 is higher than the level of the bottom plate of the storage box 41 and lower than the level of the top surface of the lowermost one among the base plates 6 in the storage box 41.

When the 3D printing bottom plate system described above is applied in the work of replacing base plates, a plurality of base plates that need to be replaced are first placed horizontally in the storage unit for base plates, the first slider 22, driven by the driving device, drives the printing bottom plate 3 fixed to the first slider 22 to move rightwards, the printing bottom plate 3 continues moving when the bottom plate support 31 of the printing bottom plate 3 comes into contact with the storage box 41 of the storage unit 4 for base plates, at this time, the storage box 41 is subjected to a rightward thrust, and moves rightwards together with the second slider 23. Since the stopper block 42 is fixedly connected at the right end of the base 1, when the storage box 41 moves, the stopper block 42 passes through the second opening and the third opening 411 on the bottom plate of the storage box 41, thereby preventing the lowermost one among the base plates 6 in the storage box 41 from moving together with the storage box 41. During the rightward movement of the storage box 41, the lowermost base plate 6 is moved out from the first opening 412 and gradually enters the sliding grooves of the bottom plate support 31. Driven by the driving device, the first slider 22 then drives the bottom plate support 31 to move leftwards, the base plate 6 is fixed by stopping members 32 on the sliding grooves. As the left end of the base plate 6 is subjected to a relatively large frictional force from the stopping members 32 and the right end of the base plate which end is left in the storage box 41 is subjected to no force or only a very small frictional force, the base plate 6 is driven by the bottom plate support 31 to move leftwards until it is completely carried away from the storage unit 4 for base plates, but a portion of the base plate 6 does not entirely enter the sliding grooves. The second slider 23 is driven by the driving device to move leftwards, and the storage unit 4 for base plates correspondingly moves leftwards and returns to the initial position. The first slider 22 moves rightwards again, and continues moving when the right edge of the base plate on the bottom plate support 31 touches the storage box 41. Since the lowermost base plate in the storage box 41 does not move due to being blocked by the stopper block 42, thus providing a thrust applied to the base plate 6 in the sliding grooves, and the portion of the base plate 6 that does not entirely enters the sliding grooves are completely pushed into the sliding grooves, and the stopping members 42 fix the base plate 6, thereby completing the process of installing the base plate.

After the completion of one printing, the base plate can be further replaced again by repeating the above operations. The subsequent replacement and installation of the base plate are distinguished from the first time of installation of the base plate in that when the first slider 22 moves rightwards, while a base plate 6 in the storage box 41 enters the sliding grooves, a base plate on the bottom plate support 31 which base plate carries a model thereon is pushed leftwards and pushed out of the sliding grooves by the base plate in the storage box, and a buffer platform may be provided at the left of the 3D printing bottom plate system for receiving the base plate which carries a model thereon.

When the above 3D printing bottom plate system is put into use, the printing bottom plate reciprocates twice or more in a left-right movement, such that the base plate is replaced automatically; and a user can upload a plurality of model files at one time, and a control system of a 3D printer can automatically accomplish the work of replacing the base plates by means of the 3D printing bottom plate system, such that the plurality of model files are printed in sequence, which improves the convenience of printing molding, saves the printing time and increases the printing efficiency.

For the above-mentioned stopping members 32, stopping members (e.g., common stopping sheets, etc.) that have been commercialized may be used. In the case where each of the stopping members is a stopping sheet, when a relatively large side thrust is applied to the base plate, the frictional force from the stopping members is smaller than the thrust, and the base plate is pushed to move, and when one end of the base plate is subjected to the frictional force from the stopping members and the other end undergoes no force, the frictional force is sufficient to cause the base plate to move with the bottom plate support. Each of the stopping members 32 may also be a one-way snap-fit structure, so that the base plate can slide leftwards only in the sliding grooves, and cannot slide rightwards. In addition, in the above-described 3D printing bottom plate system, the stopping members 32 also serve the function of fixing the base plates, so that the base plates will not be affected by the vibration generated by the operation of the printhead of the 3D printer.

The above-mentioned sliders include the first slider and/or the second slider. The above-mentioned driving device may drive the first slider 22 and the second slider 23 separately, or may drive the first slider 22 only. When the driving device drives the first slider 22 only, preferably, power can be provided for the return of the storage box 41 by mounting a spring rod 43 in the 3D printing bottom plate system. Specifically, the above 3D printing bottom plate system further comprises the spring rod 43 disposed below the storage box 41 in the left-right orientation, the left end of the spring rod 43 is fixedly connected with the left end of the storage box 41, and the right end of the spring rod is fixedly connected with the right end of the base 1; and the driving device is configured to drive the first slider 22 to move in the direction of the sliding rail 21. The fixed connection between the left end of the spring rod 43 and the left end of the storage box 41 may specifically be achieved by a corner fitting 48. By mounting the spring rod 43, the power consumption of the driving device may be reduced, thereby reducing the power consumption required for the replacement of the base plates in the entire 3D printing bottom plate system.

Further, when the 3D printing bottom plate system is put into use, it is also feasible to accomplish the replacement of a base plate by three or more times of reciprocating movement of the printing bottom plate, because in the case where the length of each of the base plates is not changed, if the length of the 3D printing bottom plate system is reduced, multiple times of reciprocating movement of the printing bottom plate are required for completely carrying the base plate away from the storage box. To replace the base plate through multiple times of reciprocating makes it possible to reduce the length of the entire 3D printing bottom plate system, thereby saving space and materials consumption.

Referring to FIG. 1 to FIG. 8, an embodiment of the present disclosure provides a 3D printing bottom plate system, which may comprise a printing bottom plate 3 and a storage unit 4 for base plates.

The storage unit 4 for base plates is configured to store base plates that may be used for carrying printing materials ejected from a printhead during 3D printing, i.e., for carrying a 3D print product. The base plates stored in the storage unit 4 for base plates may be unused base plates, and optionally, a plurality of base plates may be placed in the storage unit 4 for base plates horizontally in a stacked manner.

The printing bottom plate 3 is configured to bring a base plate stored in the storage unit 4 for base plates to a preset working position by cooperating with the storage unit 4 for base plates so that the base plate is located in the working area of the 3D printhead.

Specifically, the printing bottom plate 3 may move towards or away from the storage unit 4 for base plates.

In the process of moving towards the storage unit 4 for base plates, the printing bottom plate 3 cooperates with the storage unit 4 for base plates to cause the lowermost one of the base plates stored in a stacked manner in the storage unit 4 for base plates to slide onto the printing bottom plate 3. Optionally, during the movement of the printing bottom plate 3 towards the storage unit 4 for base plates, the lowermost one of the base plates stored in a stacked manner in the storage unit 4 for base plates can push the used base plate which is originally located on the printing bottom plate 3 out of the printing bottom plate 3, thereby realizing replacement of the base plate on the printing bottom plate 3.

In the process of the printing bottom plate 3 moving away from the storage unit 4 for base plates, the base plate slid onto the printing bottom plate 3 is driven by the printing bottom plate 3, and in this way, the printing bottom plate 3 can bring the unused base plate to the preset working position (i.e., to the printing area of the 3D printhead).

Optionally, the 3D printing bottom plate system may further comprise a base 1 and a sliding mechanism 2. The sliding mechanism 2 comprises a sliding rail 21 fixed to the base 1, a first slider 22 slidably mounted on the sliding rail 21, and a driving device configured to drive the first slider 22 to move in the extension direction of the sliding rail 21. The printing bottom plate 3 is fixedly mounted on the first slider 21, and driven by the driving device, the first slider 21 drives the printing bottom plate 3 to move towards or away from the storage unit 4 for base plates in the extension direction of the sliding rail 21.

Optionally, the sliding mechanism 2 further comprises a second slider 23 slidably mounted on the sliding rail 21, and the storage unit 4 for base plates may comprise a storage box 41 and a stopper block 42. The storage box 41 is fixedly mounted on the second slider 23 so that the storage box 41 is movable in the extension direction of the sliding rail 21.

In one example, the second slider 23 may be driven by the driving device to move in the extension direction of the sliding rail 21.

In another example, the 3D printing bottom plate system further comprises a spring rod 43, wherein the spring rod 43 may provide power for the moving back of the storage box 41. Specifically, optionally, the 3D printing bottom plate system may further comprise a spring rod 43 that may be disposed below the storage box 41 in the extension direction of the sliding rail 21, one end of the spring rod 43 is fixedly connected to the storage box 41 (for example, by a corner fitting 48) and the other end spring rod 43 is fixedly connected to the base 1.

When the driving device drives the first slider 22 to move towards the storage box 41, the first slider 22 drives the printing bottom plate 3 to move, and when the printing bottom plate 3 comes into contact with the storage box 41 and pushes the storage box 41 to move together, the spring rod 43 is subjected to a force and is compressed.

When the driving device drives the first slider 22 to move in the direction away from the storage box 41, the first slider 22 drives the printing bottom plate 3 to move, and at this time, the compressed spring rod 43 applies a force to the storage box 41 to cause the storage box 41 to move towards the printing bottom plate 3. In this way, by mounting the spring rod 43, the power consumption of the driving device may be reduced, thereby reducing the power consumption required for the replacement of the base plates of the entire 3D printing bottom plate system.

The bottom of one side of the storage box 41 facing the printing bottom plate 3 is provided with a first opening 412, and the lowermost one of the base plates stored in a stacked manner in the storage box 41 can slide out of the storage box 41 via the first opening 412. The stopper block 42 is configured to prevent the lowermost base plate in the storage box 41 from moving together with the storage box 41.

When the storage box 41 is pushed by the printing bottom plate 3 or driven by the second slider to move away from the printing bottom plate 3, the stopper block 42 prevents the lowermost base plate in the storage box 41 from moving together with the storage box 41, so that the lowermost base plate slides out of the storage box 41 from the first opening 412. Thus, after sliding out of the storage box 41, the lowermost base plate in the storage box 41 can slide onto the printing bottom plate 3.

Specifically, the bottom of one side of the storage box 41 away from the printing bottom plate 3 is provided with a second opening 412, and a third opening 411 communicating with the second opening 412 is provided at the bottom of the storage box 41 and in the extension direction of the sliding rail 21. When the storage box 41 moves, the stopper block 42 extends into the storage box 41 through the second opening 412 or the third opening 411, thereby preventing the lowermost base plate in the storage box 41 from moving together with the storage box 41.

In other words, the stopper block 42 may be provided on the one side of the storage box 41 for base plate away from the printing bottom plate 3, and the stopper block 42 extends into the storage box 41 for base plate from below the storage box 41 for base plate through the second opening 412 or the third opening 411, with the height by which the stopper block 42 protrudes from the bottom surface of the storage box 41 for base plate being smaller than the thickness of one base plate. Since the stopper block 42 is relatively fixed, when the storage box 41 for base plate moves away from the printing bottom plate 3, the stopper block will prevent the lowermost base plate stored in the storage box 41 for base plate from moving together with the storage box for base plate, and in this way, the lowermost base plate in the storage box 41 for base plate will be pushed out of the storage box 41 for base plate by the stopper block.

Optionally, the printing bottom plate 3 may comprise a bottom plate support 31, sliding grooves are provided on the two sides of the bottom plate support 31 in the extension direction of the sliding rail 21, and the sliding grooves are configured to restrain the base plate slid onto the printing bottom plate 3 from moving in the direction of the sliding grooves. Each sliding groove is provided with a stopping member 32, the stopping member 32 is configured to allow the base plate to move away from the storage unit 4 for base plates relative to the printing bottom plate 3 and to prevent the base plate from moving towards the storage unit 4 for base plates relative to the printing bottom plate 3. In this way, the base plate can only move in one direction on the bottom plate support 31 after sliding to the printing bottom plate 3, which prevents the base plate from sliding back to the storage unit 4 for base plates. In the above-described 3D printing bottom plate system, the stopping members 32 may also function to fix the base plate so that the base plate will not be affected by the vibration generated by the operation of the printhead of the 3D printer.

The storage unit 4 for base plates further comprises a first support member 44 and a second support member 45 that are respectively fixed to the two ends of the bottom plate of the storage box 41 in the extension direction of the sliding rail 21, and the storage unit further comprises a feed rod 47 fixed between the first support member and the second support member in the extension direction of the sliding rail 21. The second slider 23 is fixedly connected to the storage box 41 by the first support member 44.

The storage unit 4 for base plates further comprises a third support member 46 fixed to the base 1 and located between the first support member 44 and the second support member 45. The third support member 46 is provided with a feed rod hole allowing the feed rod to pass through.

Based on the above design, the working process of the 3D printing bottom plate system provided in this embodiment is as follows:

During printing, the printing bottom plate 3 is located below the 3D printhead so that the base plate on the printing bottom plate 3 is located within the working area of the 3D printhead. After the completion of one printing, the driving device drives the first slider 22 to move the printing bottom plate 3 towards the storage unit 4 for base plate.

After coming into contact with the storage unit 4 for base plates, the printing bottom plate 3 continues moving towards the storage unit 4 for base plates so as to push the storage unit 4 for base plates to move together with it. During the movement of the storage unit 4 for base plates, due to the blocking by the stopper block 42, the lowermost base plate in the storage unit 4 for base plates will stay in the original place and cannot move together with the storage unit 4 for base plate. During the continued movement of the storage unit 4 for base plates, the lowermost base plate at least partially slides out of the storage unit for base plates from the first opening 412.

In the meantime, the printing bottom plate 3 also continues moving towards the storage unit 4 for base plates and pushes the storage unit 4 for base plates to move, and the original lowermost base plate in the storage unit 4 for base plates gradually slides onto the printing bottom plate 3 after being pushed out of the storage unit 4 for base plates, and pushes the used base plate that is originally located on the printing bottom plate 3 away from the printing bottom plate 3.

In this process, by multiple times of reciprocating movement of the printing bottom plate 3 towards or away from the storage unit for base plates, the base plate pushed out of the storage unit 4 for base plates can completely slide onto the printing bottom plate 3.

For example, after the lowermost base plate in the storage unit 4 for base plates partially slides onto the printing bottom plate 3, the printing bottom plate 3 moves away from the storage unit 4 for base plates. The storage unit 4 for base plates also moves towards the printing bottom plate 3 until the storage unit 4 for base plates moves back to the initial position. The printing bottom plate 3 continues to move away from the storage unit 4 for base plates and is separated from the storage unit 4 for base plates. Since the stopping members 32 on the printing bottom plate 3 restricts the moving direction of the base plate slid onto the printing bottom plate 3, after being separated from the storage unit 4 for base plates, the printing bottom plate 3 drives the base plate partially slid onto the printing bottom plate 3 to together move away from the storage unit 4 for base plates, until the base plate is withdrawn from the storage unit 4 for base plate. At this time, the other base plates disposed in a stacked manner in the storage unit 4 for base plates fall down to fill the position of the withdrawn base plate.

The printing bottom plate 3 then moves again towards the storage unit for base plates, until the base plate partially slid onto the printing bottom plate 3 abuts against the current lowermost base plate in the storage unit 4 for base plates, and continues moving. Since the current lowermost base plate in the storage unit 4 for base plates cannot move due to the stopper block 42, the base plate partially slid onto the printing bottom plate 3 is also pushed and stays in the original place, while the printing bottom plate 3 continues to move towards the storage unit 4 for base plates, so that the base plate partially slid onto the printing bottom plate 3 slides further onto the printing bottom plate 3.

It should be noted that, the above reciprocating movement of the printing bottom plate 3 towards or away from the storage unit 4 for base plates may be not limited to two times as described in the above example, and the printing bottom plate 3 may also cause the base plate partially slid onto the printing bottom plate 3 to completely slide onto the printing bottom plate 3 by more times of the reciprocating movement. In the case where the length of the base plate is constant, replacing the base plate by multiple times of reciprocating movement of the printing bottom plate 3 can reduce the length of the entire 3D printing bottom plate system and save space.

Optionally, the above base 1 may be formed by splicing a left stop plate 12, a right stop plate 13 and side plates 11. The left ends of the two side plates 11 are fixedly connected with the left stop plate 12 and the right ends of the two side plates are fixedly connected with the right stop plate 13, thereby forming a stable base 1. The height of the left stop plate 12 is smaller than the height of the base plate fixed to the printing bottom plate 3, so that at the time of replacing the base plate, the left stop plate 12 serves as a buffer platform, which can carry a base plate with a model so that the base plate is smoothly brought away from the printing bottom plate 3. A plurality of sliding rails 21 may be provided on the base 1, the printing bottom plate 3 and the storage unit 4 for base plates may be disposed on the sliding rails 21 by a plurality of sliders, and in this way, the process of sliding and replacing the base plate can be smoother and steadier.

The driving device may comprise a lead screw 24 disposed in the extension direction of the sliding rail 21, a nut screwed to the lead screw 24, and a motor 25. The nut is fixedly connected to the first slider 22, the direction of the lead screw is parallel to the direction of the sliding rail 21, and the motor is configured to drive the lead screw 24 to rotate in a first direction or a second direction so as to drive the nut on the lead screw 24 to move towards or away from the storage unit 4 for base plates. By means of the lead screw 24 and the motor 25, it is possible to drive the first slider 22 easily and accurately, which facilitates realizing mechanical automation of the 3D printing bottom plate system. The above described lead screw 24 (i.e., lead screw pair) may be a threaded lead screw, a ball screw, etc.

The nut of the lead screw may be fixedly connected with a support plate 33 by means of a corner fitting 26, and the first slider 22 may also be fixedly connected with the support plate 33, so that an indirect fixed connection relation is formed between the nut of the lead screw and the first slider 22, enabling the lead screw pair to drive the first slider 22 to move.

Figure 1:
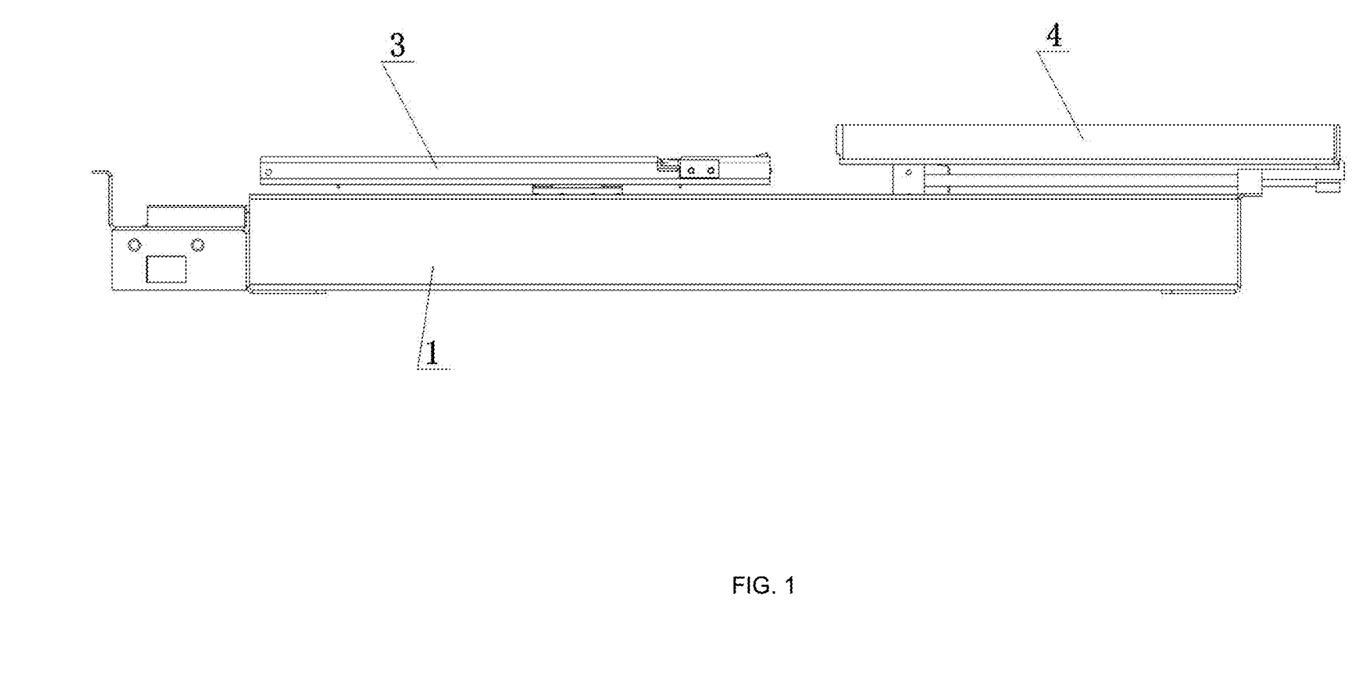
FIG. 1 is a structural schematic front view of one embodiment of the 3D printing bottom plate system of the present disclosure.
Figure 2:
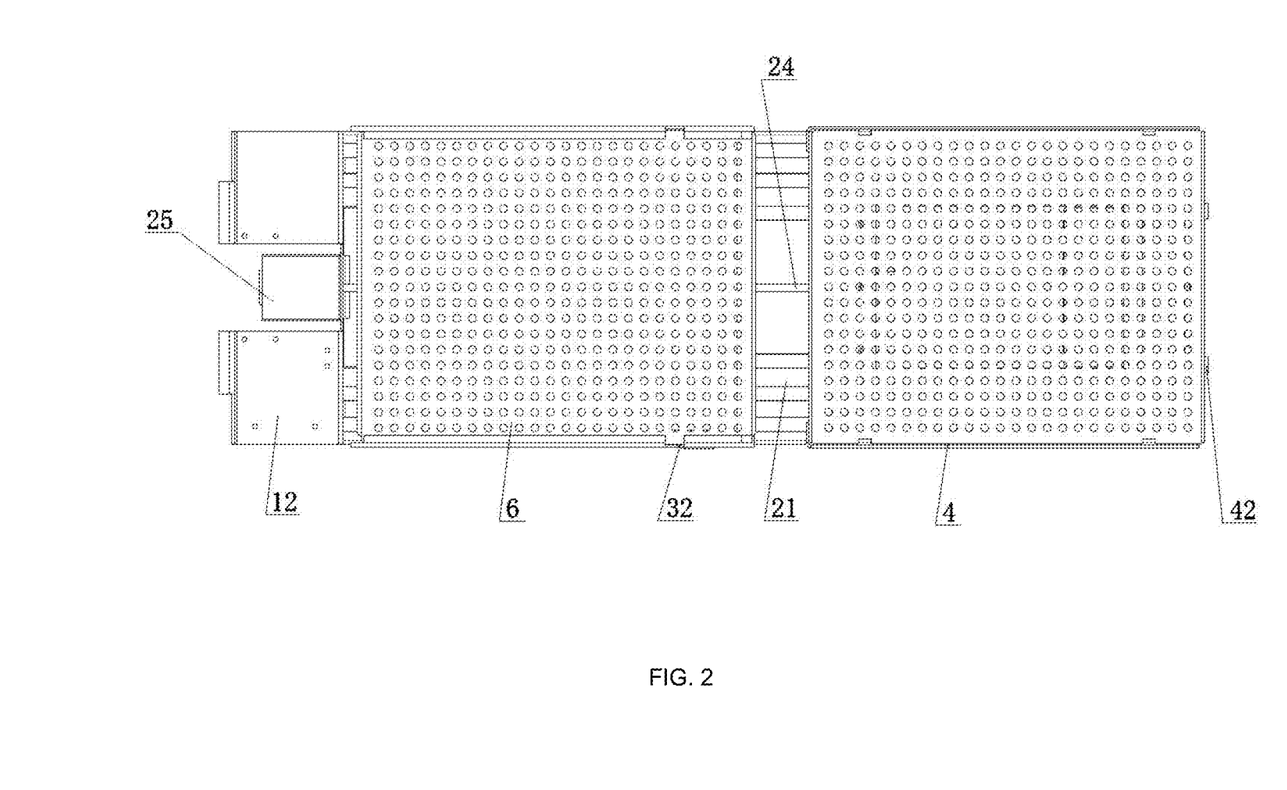
FIG. 2 is a structural schematic top view of one embodiment of the 3D printing bottom plate system of the present disclosure.
Figure 3:
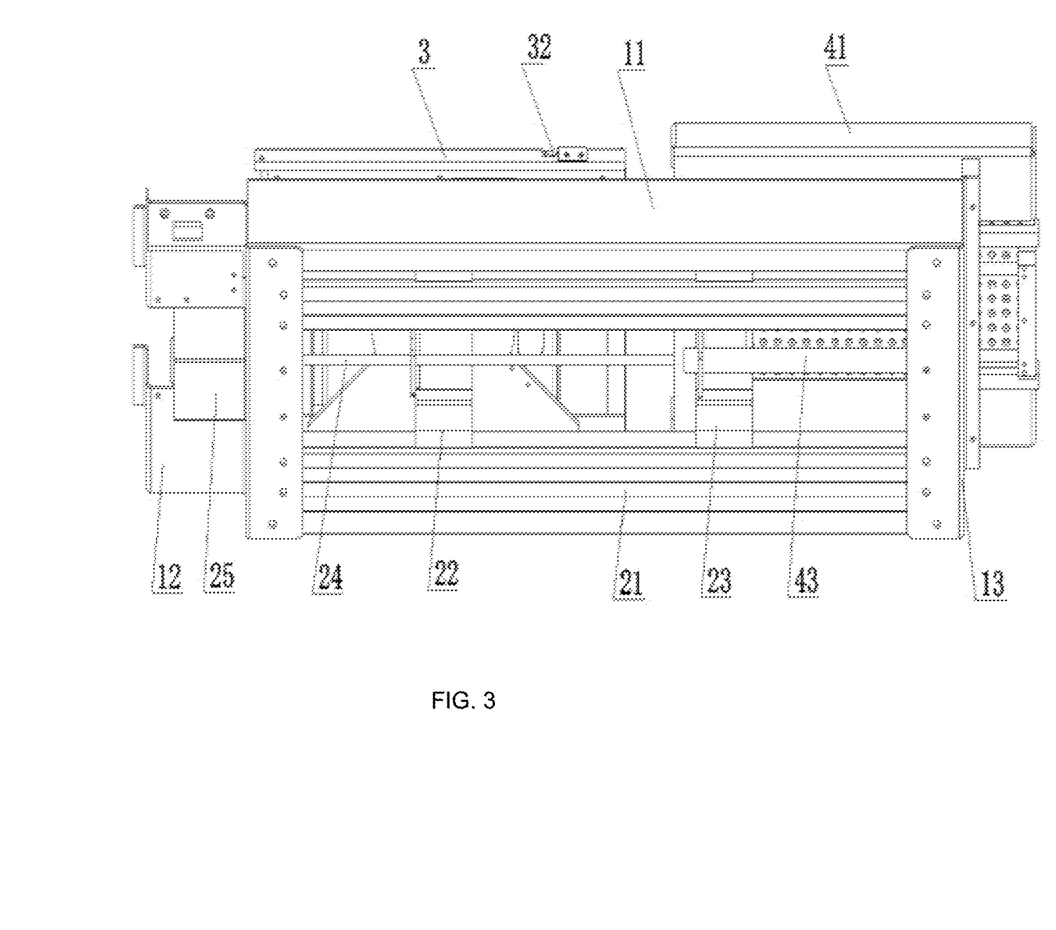
FIG. 3 is a structural schematic bottom view from 45°-angle of one embodiment of the 3D printing bottom plate system of the present disclosure.
Figure 4:
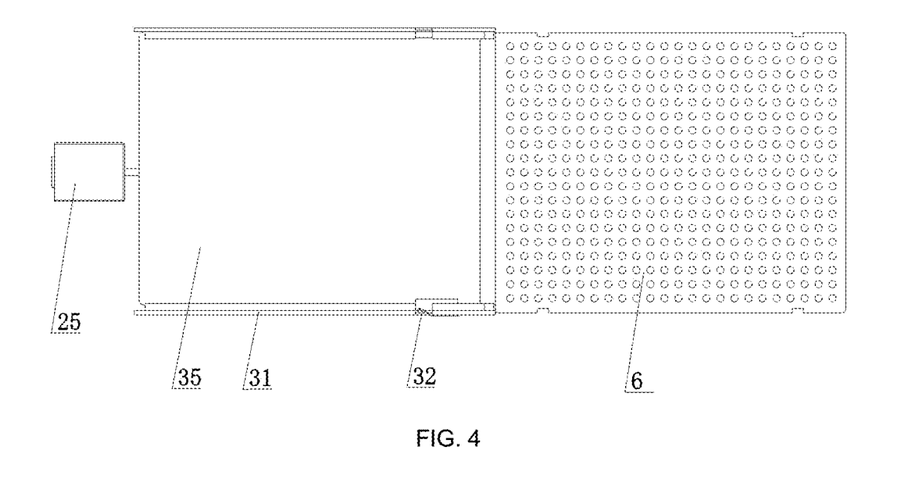
FIG. 4 is a structural schematic top view of one embodiment of a printing bottom plate in the 3D printing bottom plate system of the present disclosure.
Figure 5:
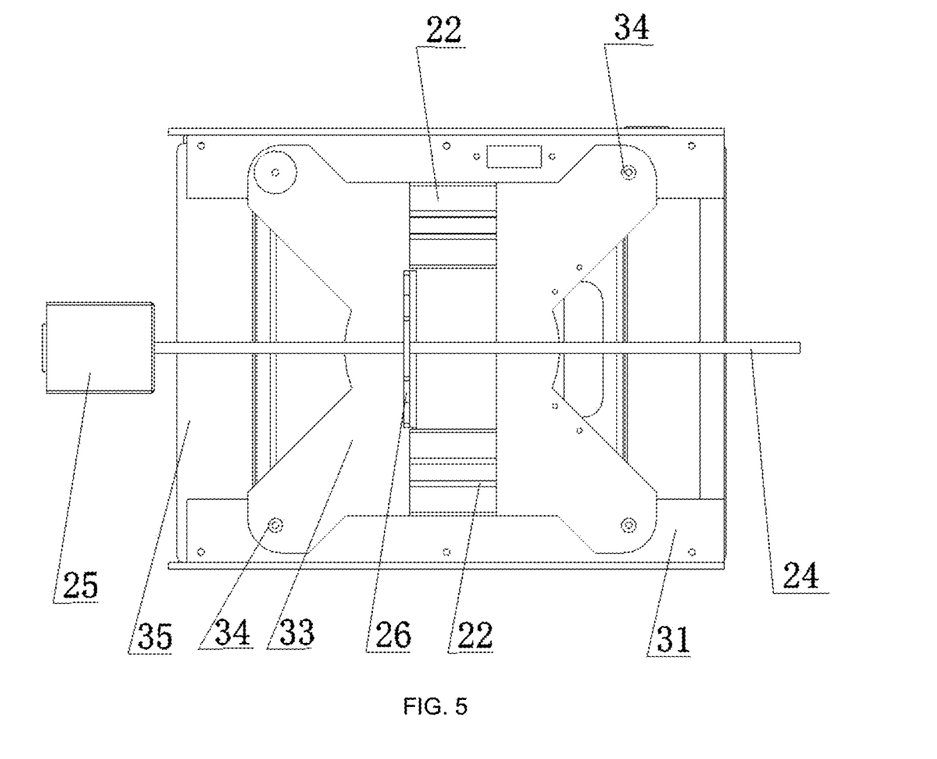
FIG. 5 is a structural schematic bottom view of one embodiment of the printing bottom plate in the 3D printing bottom plate system of the present disclosure.
Figure 8:
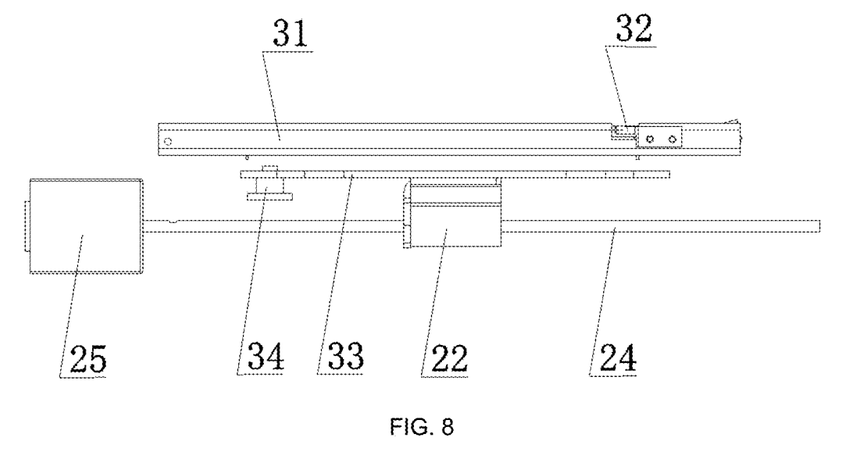
FIG. 8 is a structural schematic front view of one embodiment of a sliding mechanism in the 3D printing bottom plate system of the present disclosure.

Optionally, the above printing bottom plate 3 further comprises the support plate 33 and a leveling nut 34. The support plate 33 is fixedly mounted on the first slider 22, and the bottom plate support 31 is fixed to the support plate 33 by the leveling nut 34. Specifically, for example, as shown in FIG. 5 and FIG. 8, the support plate 33 is provided with four leveling nuts 34 at the four corners thereof, respectively, and is connected with the bottom plate support 31 by the leveling nuts 34. The leveling nuts 34 are configured to adjust the flatness of the printing bottom plate 3. In this way, it is possible to adjust the horizontality of the support plate 33 by the leveling nuts 34 so that the base plate maintains the horizontality when placed on the support plate 33, ensuring the accuracy of 3D printing.

Optionally, the above storage unit 4 for base plates further comprises a first support member 44 and a second support member 45 respectively fixed to the left end and the right end of the bottom plate of the storage box 41, and a feed rod 47 fixed, in the left-right orientation, between the first support member 44 and the second support member 45, and the second slider 23 is fixedly connected with the storage box 41 by the first support member 44. By means of the first support member 44 and the second support member 45, the storage box 41 is elevated to a certain height, thereby preventing the storage unit 4 for base plates from partially scratching other structures, such as the stopper block 42 and the like, during movement. By providing the feed rod 47 between the first support member 44 and the second support member 45, it is possible to make the storage box 41 more stable while moving, and also prevent deformation of the storage box due to being unevenly stressed.

The storage unit 4 for base plates further comprises a third support member 46 fixed to the base 1 and located between the first support member 44 and the second support member 45, wherein the third support member 46 is provided thereon with a feed rod hole (not denoted in the figures) allowing the feed rod 47 to pass through. The arrangement of the third support member 46 adds a support point for the storage box 41, further making the storage box 41 more stable while moving, while preventing it from being unevenly stressed.

Optionally, the bottom plate support 31 is further provided thereon with an aluminum substrate 35 for supporting the base plate, and a heating assembly is further provided on the aluminum substrate. The aluminum substrate 35 serves to support the base plate, and at the same time cooperates with the heating assembly so that the entire base plate is more uniformly heated when the printing bottom plate 3 needs to be heated.

Figure 9:
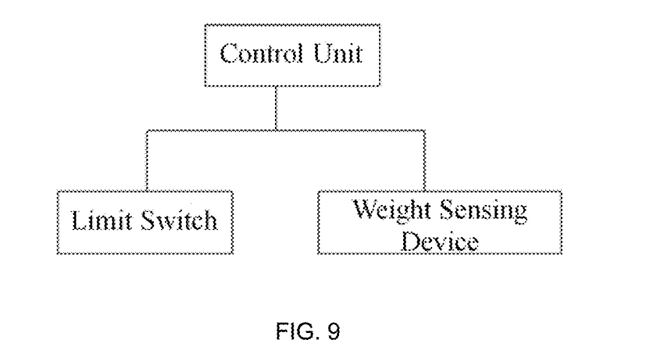
FIG. 9 is a schematic diagram of connection relation among a control unit, a first limit switch and a weight sensing device in the 3D printing bottom plate system according to one embodiment of the present disclosure.

Optionally, referring to FIG. 9, a weight sensing device is further mounted on the bottom plate of the storage box 41, a first limit switch triggered by the first slider 22 is further provided on the base 1, the 3D printing bottom plate system further comprises a control unit respectively connected with the weight sensing device and the first limit switch, wherein the control unit is configured to control turn-on and turn-off of the driving device according to a signal of the weight sensing device and/or the first limit switch. The weight sensing device comprises a sensor stopper block 51 which passes through the bottom plate of the storage box 41 through the third opening 411 and is fixedly connected with the storage box 41, and the weight sensing device comprises a second limit switch triggered by the sensor stopper block 51, wherein the control unit is connected with the second limit switch.

Figure 6:
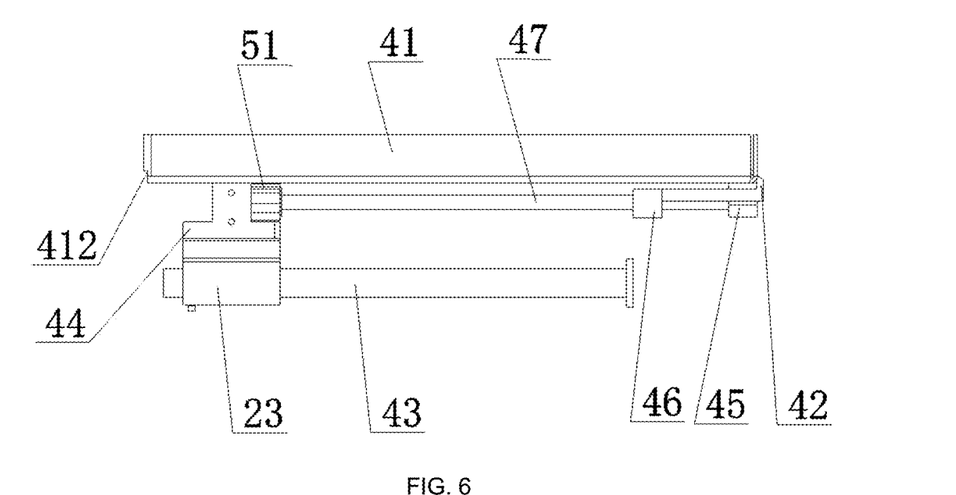
FIG. 6 is a structural schematic front view of one embodiment of a storage unit for base plates in the 3D printing bottom plate system of the present disclosure.
Figure 7:
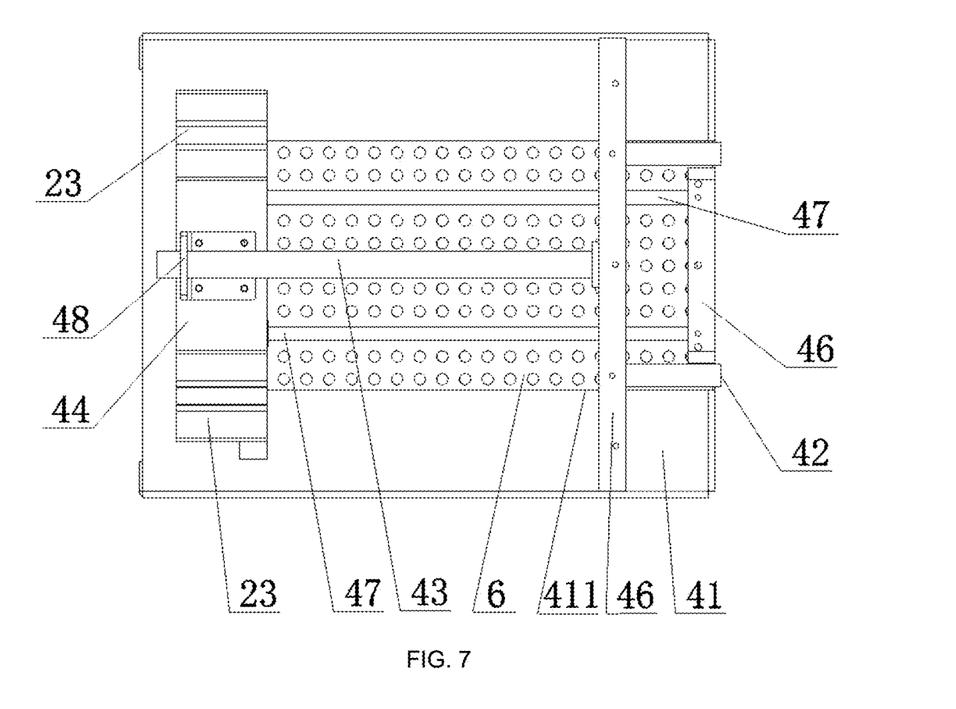
FIG. 7 is a structural schematic bottom view of one embodiment of the storage unit for base plates in the 3D printing bottom plate system of the present disclosure.
Figure 10:
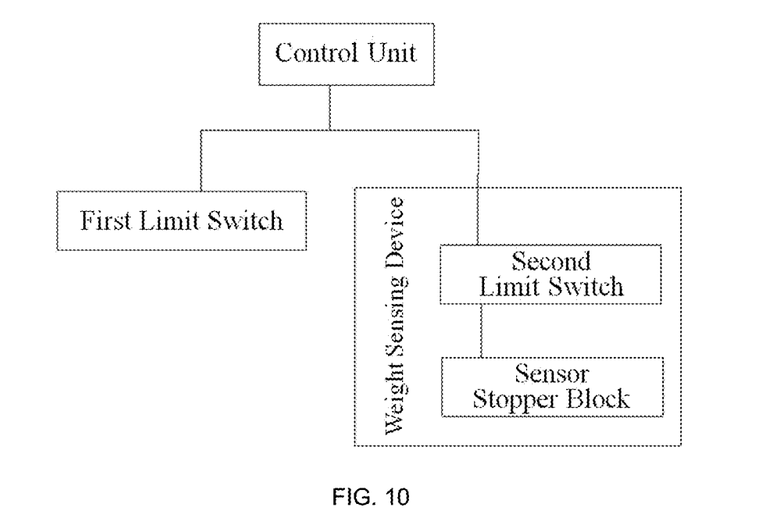
FIG. 10 is a schematic diagram of connection relation among the control unit, the first limit switch and the weight sensing device in the 3D printing bottom plate system according to another embodiment of the present disclosure.
Figure 11:
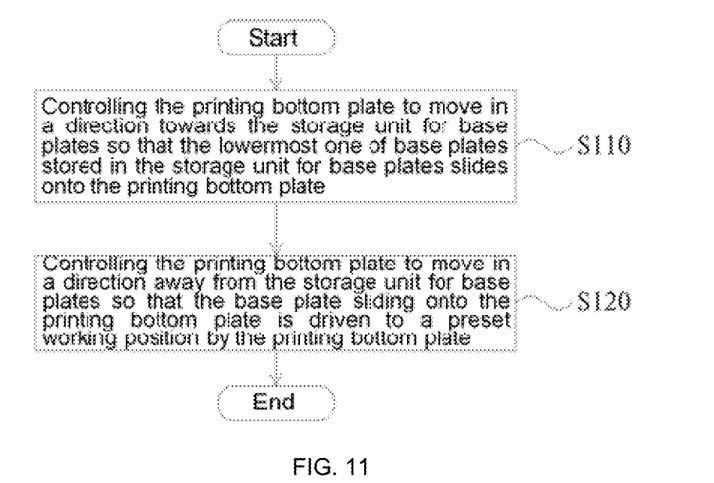
FIGS. 11-13 are flow diagrams of a method of replacing a 3D printing base plate according to the present disclosure.
Figure 12:
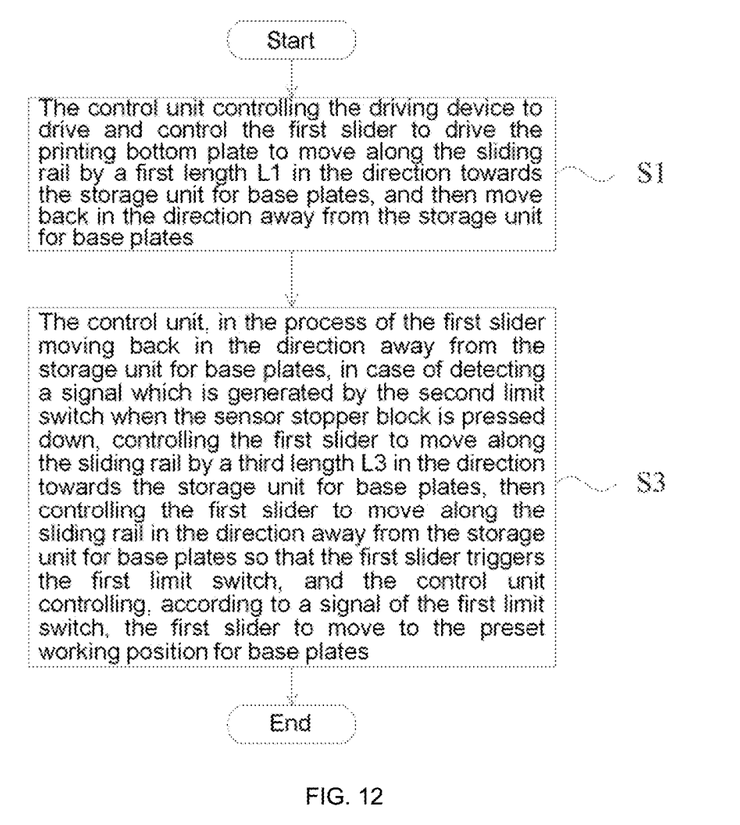
Figure 13:
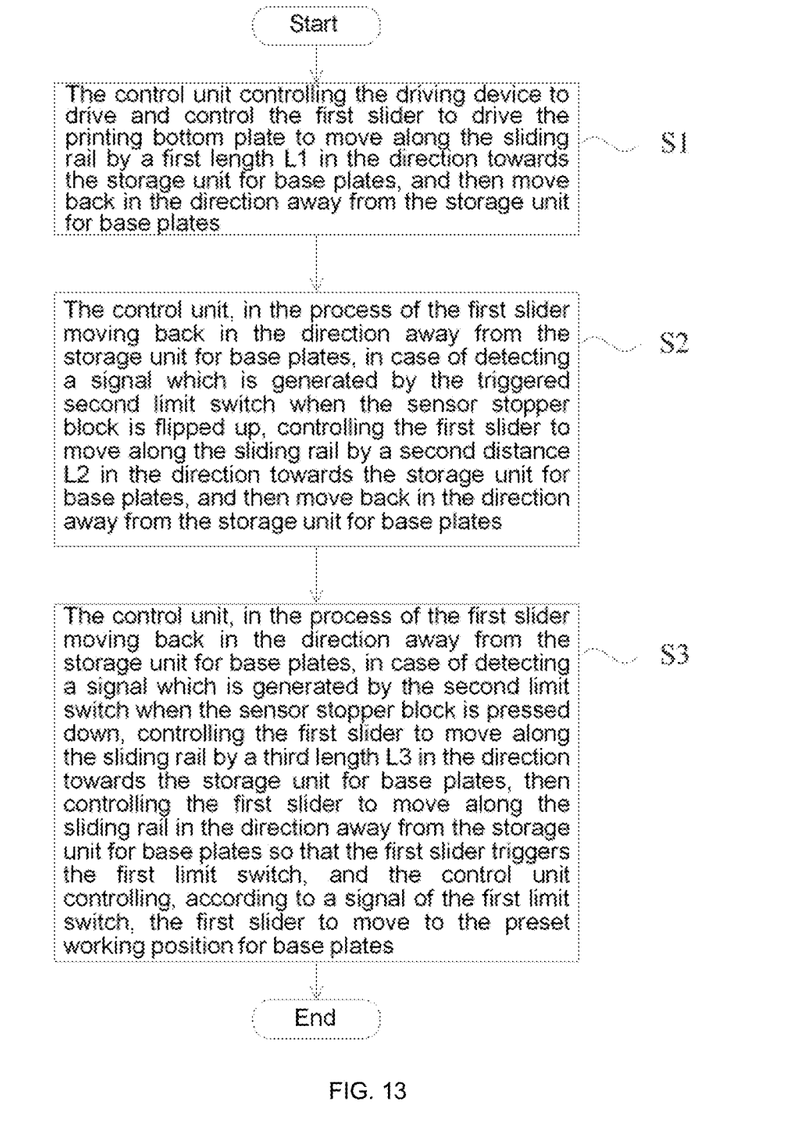

Further, referring to FIGS. 6 and 10, the weight sensing device comprises the sensor stopper block 51 which passes through the bottom plate of the storage box through the third opening 411 and is fixedly connected with the storage box 41, and the weight sensing device comprises the second limit switch triggered by the sensor stopper block 51, and the control unit is connected with the second limit switch.

The sensor stopper block 51 may also be fixedly connected with the first support member 45, and thereby indirectly fixedly connected with the storage box 41 via the first support member 45. When there are base plates 6 disposed in the storage box 41, the sensor stopper block 51 is pressed down, when subjected to the weight of the base plates 6, to be flush with the bottom plate of the storage box, and when the lowermost base plate 6 partially slides out of the storage box 41 and moves away from the position of the sensor stopper block 51, the sensor stopper block 51 is flipped up and triggers the second limit switch. At this time, the control unit can control, according to the signal of the second limit switch, the driving device to drive the first slider 22 to move rightwards. The height of the sensor stopper block 51 after flip-up is larger than the height of the bottom plate of the storage box, such that the sensor stopper block 51 that has been flipped up can also block the movement of the base plate and provide a thrust for the base plate, thereby pushing the base plate further onto the printing bottom plate 3. The first slider 22 moves leftwards again to bring the base plate completely away from the storage box 41, at this time, the base plates 6 remaining in the storage box 41 fall down, the sensor stopper block 51 is pressed down again, the action of press-down of the sensor stopper block causes the second limit switch to generate a signal, and the control unit controls, according to the signal, the first slider 22 to move rightwards again. Due to the blocking by the new lowermost base plate in the storage box 41, the base plate that has partially slid onto the printing bottom plate 3 is subjected to a thrust, so that the base plate is entirely pushed into the sliding grooves. By means of the above-described devices, fully automated operations of plate replacement are realized, so that continuous printing can be realized.

An embodiment of the present disclosure further provides a method of replacing a 3D printing base plate, applicable to the above-described 3D printing bottom plate system comprising the printing bottom plate 3 and the storage unit 4 for base plates, and the 3D printing bottom plate system is capable of performing, under the control of control elements of the 3D printing bottom plate system, the following steps.

Step S110, a control unit controlling the printing bottom plate 3 to move in a direction towards the storage unit 4 for base plates so that the lowermost one of base plates stored in the storage unit 4 for base plates slides onto the printing bottom plate 3.

Step S120, the control unit controlling the printing bottom plate 3 to move in a direction away from the storage unit 4 for base plates so that the base plate slid onto the printing bottom plate 3 is driven to a preset working position by the printing bottom plate 3.

Optionally, in step S110, the control unit can control the printing bottom plate 3 to move in the direction towards the storage unit 4 for base plates so that the lowermost one of the base plates stored in the storage unit 4 for base plates at least partially slides onto the printing bottom plate 3. The printing bottom plate 3 is then controlled to reciprocate at least once to get close to or away from the storage unit 4 for base plates, so that the base plate partially slid onto the printing bottom plate 3 slides completely onto the printing bottom plate 3.

Optionally, when the printing bottom plate 3 is controlled to reciprocate at least once to get close to or away from the storage unit 4 for base plates so that the base plate partially slid onto the printing bottom plate 3 slides completely onto the printing bottom plate 3, the control unit can control the printing bottom plate 3 to drive the base plate partially slid onto the printing bottom plate 3 to move in the direction away from the storage unit 4 for base plates; and then, when it is detected that the base plate partially slid onto the printing bottom plate 3 completely slides out of the storage unit 4 for base plates, the printing bottom plate 3 is controlled to move in the direction towards the storage unit 4 for base plates, so that the current lowermost base plate in the storage unit 4 for base plates pushes the base plate partially slid onto the printing bottom plate 3 to slide completely onto the printing bottom plate 3.

Specifically, the above 3D printing bottom plate system further comprises a first limit switch and a sensor stopper block; wherein the first limit switch generates a signal when the printing bottom plate 3 moves into contact with the storage unit 4 for base plates, the sensor stopper block is disposed in the storage unit 4 for base plates, and when flipped up, the sensor stopper block prevents the base plate at least partially slid onto the printing bottom plate 3 from moving in the direction of sliding into the storage unit 4 for base plates.

The printing bottom plate 3 is controlled to drive the base plate partially slid onto the printing bottom plate 3 to move in the direction away from the storage unit 4 for base plates, so that the base plate partially slid onto the printing bottom plate 3 is driven to move by the printing bottom plate 3 and no longer presses the sensor stopper block.

Upon the detection of the signal triggered by the flip-up of the sensor stopper block, the printing bottom plate 3 is controlled to move in the direction towards the storage unit 4 for base plates, so that the base plate partially slid onto the printing bottom plate 3 continues to slide onto the printing bottom plate 3 due to the blocking by the sensor stopper block that has been flipped up.

Upon the detection of the signal generated by the first limit switch, the printing bottom plate 3 is controlled to drive the base plate partially slid onto the printing bottom plate 3 to move in the direction away from the storage unit 4 for base plates, so that the base plate partially slid onto the printing bottom plate 3 is driven by the printing bottom plate 3 to completely move away from the storage unit 4 for base plates, and the other base plates stored in the storage unit 4 for base plates fall and press the sensor stopper block.

Upon the detection of the sensor stopper block being pressed, the printing bottom plate 3 is controlled to drive the base plate partially sliding onto the printing bottom plate 3 to move in the direction towards the storage unit 4 for base plates, so that the current lowermost base plate in the storage unit 4 for base plates pushes the base plate partially slid onto the printing bottom plate 3 to slide completely onto the printing bottom plate 3.

The method above described is explained below by an example in which the method may comprise steps S1 and S3.

Step S1. the control unit controlling the driving device to drive and control the first slider 22 to drive the printing bottom plate 3 to move by a first length $L_1$ along the sliding rail 21 in the direction towards the storage unit 4 for base plates, and then move back in the direction away from the storage unit 4 for base plates.

During the movement of the first slider 22 in the direction towards the storage unit 4 for base plates, the first slider 22 drives the printing bottom plate 3 to push the storage unit 4 for base plates to move together, and at the same time, under the action of the stopper block 42, the lowermost base plate in the storage unit 4 for base plates partially slides onto the printing bottom plate 3.

During the movement of the first slider 22 in the direction away from the storage unit 4 for base plates, due to the action of the stopping members 32 on the printing bottom plate 3, the printing bottom plate 3 drives the base plate partially slid onto the printing bottom plate 3 to move away from the storage unit 4 for base plates.

In the above process, the original lowermost base plate in the storage unit 4 for base plates partially slides out of the storage unit 4 for base plates, then the sensor stopper block 51 that is originally pressed by the base plate is flipped up.

Step S3. the control unit, in the process of the first slider 22 moving back in the direction away from the storage unit 4 for base plates, in a case of detecting a signal which is generated by the second limit switch when the sensor stopper block 51 is pressed down, controlling the first slider 22 to move by a third length $L_3$ along the sliding rail in the direction towards the storage unit 4 for base plates, then controlling the first slider 22 to move along the sliding rail in the direction away from the storage unit 4 for base plates so that the first slider 22 triggers the first limit switch, and the control unit controlling, according to a signal of the first limit switch, the first slider 22 to move to the preset working position.

The first slider 22 moves continuously in the direction away from the storage unit 4 for base plates until the original lowermost base plate in the storage unit 4 for base plates completely leaves the storage unit 4 for base plates. At this time, the other base plates stored in a stacked manner in the storage unit 4 for base plates fall due to gravity and press the sensor stopper block 51, and the second limit switch generates a signal. After receiving the signal generated by the second limit switch, the control unit controls the first slider 22 to move along the sliding rail in the direction away from the storage unit 4 for base plates. During this process, the current lowermost base plate in the storage unit 4 for base plates pushes the base plate partially slid onto the printing bottom plate 3 to slide further onto the printing bottom plate 3. When the first slider 23 triggers the first limit switch, the base plate partially slid onto the printing bottom plate 3 has already slid completely onto the printing bottom plate 3, and the control unit controls the first slider 22 to drive the printing bottom plate to the preset working position.

In the above, the first length $L_1$ is larger than the spacing $L_0$ between the printing bottom plate 3 and the storage box 41, and the length of the base plate (contact plate) is $L_{CP}=L_1-L_0+L_3$.

Optionally, in another example, the method of replacing a 3D printing base plate may comprise steps S1, S2 and S3.

Step S1. the control unit controlling the driving device to drive and control the first slider 22 to drive the printing bottom plate 3 to move by a first length $L_1$ along the sliding rail 21 in the direction towards the storage unit 4 for base plates, and then move back in the direction away from the storage unit 4 for base plates.

Step S2. the control unit, in the process of the first slider 22 moving back in the direction away from the storage unit 4 for base plates, in a case of detecting a signal which is generated by the triggered second limit switch when the sensor stopper block 51 is flipped up, controlling the first slider 22 to move along the sliding rail 21 by a second length $L_2$ in the direction towards the storage unit 4 for base plates, and then move back in the direction away from the storage unit 4 for base plates.

In step S1, when the lowermost base plate in the storage unit 4 for base plates partially slides out of the storage unit 4 for base plates, the pressed sensor stopper block 51 is flipped up, the control unit learns that of the sensor stopper block is flipped up, and then controls the first slider 22 to move along the sliding rail 21 in the direction towards the storage unit 4 for base plates, and at this time, the base plate partially slid onto the printing bottom plate 3 slides further onto the printing bottom plate 3 under the action of the blocking by the sensor stopper block.

Step S3. the control unit, in the process of the first slider 22 moving back in the direction away from the storage unit 4 for base plates, in a case of detecting a signal which is generated by the second limit switch when the sensor stopper block 51 is pressed down, controlling the first slider 22 to move by a third length $L_3$ along the sliding rail in the direction towards the storage unit 4 for base plates, then controlling the first slider 22 to move along the sliding rail in the direction away from the storage unit 4 for base plates so that the first slider 22 triggers the first limit switch, and the control unit controlling, according to a signal of the first limit switch, the first slider 22 to move to the preset working position.

The first slider 22 moves continuously in the direction away from the storage unit 4 for base plates until the original lowermost base plate in the storage unit 4 for base plate completely leaves the storage unit 4 for base plates. At this time, the other base plates stored in a stacked manner in the storage unit 4 for base plates fall due to gravity and press the sensor stopper block 51, and the second limit switch generates a signal. After receiving the signal generated by the second limit switch, the control unit controls the first slider 22 to move along the sliding rail in the direction away from the storage unit 4 for base plate. During this process, the current lowermost base plate in the storage unit 4 for base plates pushes the base plate partially slid onto the printing bottom plate 3 to slide further onto the printing bottom plate 3. When the first slider 22 triggers the first limit switch, the base plate partially slid onto the printing bottom plate 3 has already slid completely onto the printing bottom plate 3, and the control unit controls the first slider 22 to drive the printing bottom plate to the preset working position.

In this case, the length of the base plate is $L_{CP}=L_1|L_2|L_3 L_0$.

The above-mentioned $L_1$, $L_2$ and $L_3$ may be the same or different from each other. In addition, the replacement of the base plate may also be realized by reciprocating the first slider several times (three times or more). For example, step S1 may be repeated multiple times depending on actual operating conditions, e.g., when the sliding rail is relatively short and the base plates are relatively long, step S1 needs to be repeated multiple times.

In the above-described replacement method, the steps and the corresponding parameters can be preset into the control unit, thereby realizing fully automated operation of plate replacement, and further enabling continuous 3D printing to be realized.

When the 3D printing bottom plate system provided in above-described embodiments is put into use, the base plate is replaced automatically by the cooperation between the printing bottom plate and the storage unit for base plates, so that a user does not need to replace the base plate manually when continuously printing a plurality of 3D products, which improves the convenience of printing molding, saves the printing time and increases the printing efficiency.

Finally, it should be noted that the above various embodiments merely serve to facilitate understanding the technical solutions and gists of the present disclosure, rather than limit the same; although the present disclosure has been described in detail with reference to the foregoing embodiments, it should be understood by those of ordinary skills in the art that the technical solutions described in the embodiments can still be modified, or equivalent substitution can be made to some or all of the technical features therein; and the modifications or substitutions also fall within the scope of protection of the claims of the present disclosure.

INDUSTRIAL APPLICABILITY

With the 3D printing bottom plate system and the method of replacing a 3D printing base plate provided in the embodiments of the present disclosure, the base plate is replaced automatically by the cooperation between the printing bottom plate and the storage unit for base plates, so that a user does not need to replace the base plate manually when continuously printing a plurality of 3D products, which improves the convenience of printing molding, saves the printing time and increases the printing efficiency.

The invention claimed is:

1. A 3D printing bottom plate system, comprising a printing bottom plate and a storage unit for base plates, wherein the printing bottom plate is movable in a direction towards or away from the storage unit for base plates,
    wherein in a process of the printing bottom plate moving towards the storage unit for base plates, a base plate stored in the storage unit and being in contact with a bottom of the storage unit slides onto the printing bottom plate; and
    in a process of the printing bottom plate moving away from the storage unit for base plates, the base plate slid onto the printing bottom plate is driven to a preset working position by the printing bottom plate.

2. The system according to claim 1, further comprising a base and a sliding mechanism,
    wherein the sliding mechanism comprises a sliding rail fixed to the base, a first slider slidably mounted on the sliding rail, and a driving device configured to drive the first slider to move in an extension direction of the sliding rail; and
    the printing bottom plate is fixedly mounted on the first slider, and driven by the driving device, the first slider drives the printing bottom plate to move towards or away from the storage unit for base plates in the extension direction of the sliding rail.

3. The system according to claim 2, wherein the printing bottom plate comprises a bottom plate support, sliding grooves are provided on two sides of the bottom plate support in the extension direction of the sliding rail, and the sliding grooves are configured to restrain the base plate slid onto the printing bottom plate from moving in direction of the sliding groove; and
    each sliding groove is provided with a stopping member configured to allow the base plates to move away from the storage unit for base plates relative to the printing bottom plate and to prevent the base plates from moving towards the storage unit for base plates relative to the printing bottom plate.

4. The system according to claim 2, wherein the sliding mechanism further comprises a second slider slidably mounted on the sliding rail, and the storage unit for base plates comprises a storage box and a stopper block;
    a bottom of one side of the storage box facing the printing bottom plate is provided with a first opening from which the base plate stored in the storage unit and being in contact with the bottom of the storage unit can slide out of the storage box; the storage box is fixedly mounted on the second slider, and the storage box is movable in the extension direction of the sliding rail; and the stopper block is configured to prevent the base plate stored in the storage unit and being in contact with the bottom of the storage unit from moving together with the storage box; and
    when the storage box is pushed by the printing bottom plate or driven by the second slider to move away from the printing bottom plate, the stopper block prevents the base plate stored in the storage unit and being in contact with the bottom of the storage unit from moving together with the storage box, so that the base plate in contact with the bottom of the storage unit slides out of the storage box from the first opening.

5. The system according to claim 4, wherein a bottom of one side of the storage box away from the printing bottom plate is provided with a second opening, and a third opening communicating with the second opening is provided on a bottom plate of the storage box in the extension direction of the sliding rail; and when the storage box moves, the stopper block passes through the second opening or the third opening, thereby preventing the base plate stored in the storage unit and being in contact with the bottom of the storage unit from moving together with the storage box.

6. The system according to claim 3, further comprising a spring rod that is disposed below the storage box in the extension direction of the sliding rail, and the spring rod is configured to provide power for movement of the storage box towards the printing bottom plate.

7. The system according to claim 2, wherein the driving device comprises a lead screw disposed in the extension direction of the sliding rail, a nut screwed to the lead screw, and a motor, the nut is fixedly connected to the first slider, and the motor is configured to drive the lead screw to rotate in a first direction or a second direction so as to drive the nut on the lead screw to move away from or towards the storage unit for base plates.

8. The system according to claim 2, wherein the printing bottom plate further comprises a support plate and a leveling nut, the support plate is fixedly mounted on the first slider, and the bottom plate support is fixed to the support plate by the leveling nut.

9. The system according to claim 3, wherein the storage unit for base plates further comprises a first support member and a second support member that are respectively fixed to two ends of each of the bottom plates of the storage box in the extension direction of the sliding rail, and a feed rod fixed between the first support member and the second support member in the extension direction of the sliding rail; and the second slider is fixedly connected to the storage box by the first support member.

10. The system according to claim 9, wherein the storage unit for base plates further comprises a third support member fixed to the base and located between the first support member and the second support member, and the third support member is provided with a feed rod hole allowing the feed rod to pass through.

11. The system according to claim 2, wherein the bottom plate support is further provided thereon with an aluminum substrate for supporting the respective base plate, and a heating assembly is further provided on the aluminum substrate.

12. The system according to claim 3, wherein a weight sensing device is further mounted on a bottom plate of the storage box, a first limit switch triggered by the first slider is further provided on the base, the system further comprises a control unit respectively connected with the weight sensing device and the first limit switch, the control unit is configured to control turn-on and turn-off of the driving device according to a signal of the weight sensing device and/or the first limit switch, the weight sensing device comprises a sensor stopper block which passes through the bottom plate of the storage box through the third opening and is fixedly connected with the storage box, and the weight sensing device comprises a second limit switch triggered by the sensor stopper block, and the control unit is connected with the second limit switch.

13. The system according to claim 3, wherein during movement of the printing bottom plate in the direction towards the storage unit for base plates, the base plate stored in the storage unit and being in contact with the bottom of the storage unit pushes the base plate originally located on the printing bottom plate out of the printing bottom plate.

14. A method of replacing a 3D printing base plate, which is applicable to the system according to claim 1, the method comprising steps of:
   S1. controlling a first slider to drive a printing bottom plate to move by a first length L1 along a sliding rail in a direction towards a storage unit for base plates, and then move back in a direction away from the storage unit for base plates; and
   S3. a control unit, in a process of the first slider moving back in the direction away from the storage unit for base plates, in a case of detecting a signal which is generated by a second limit switch when a sensor stopper block is pressed down, controlling the first slider to move by a third length L3 along the sliding rail in the direction towards the storage unit for base plates, then controlling the first slider to move along the sliding rail in the direction away from the storage unit for base plates so that the first slider triggers a first limit switch, and controlling, according to a signal of the first limit switch, the first slider to drive the printing bottom plate to move to a preset working position.

15. The method according to claim 14, wherein the first length L1 is larger than a spacing Lo between the printing bottom plate and the storage box, and the length of the base plates is $Lcp = L_1 - L_0 + L_3$.

16. The method according to claim 14, wherein between step S1 and step S3, the method further comprises:
   S2. the control unit, in the process of the first slider moving back in the direction away from the storage unit for base plates, in a case of detecting a signal which is generated by the triggered second limit switch when the sensor stopper block is flipped up, controlling the first slider to move by a second length L2 along the sliding rail in the direction towards the storage unit for base plates, and then move back in the direction away from the storage unit for base plates, wherein the length of the base plates is $Lcp = L_1 + L_2 + L_3 - L_0$.

17. A method of replacing a 3D printing base plate, which is applicable to a 3D printing bottom plate system comprising a printing bottom plate and a storage unit for base plates, the method comprising steps of:
   controlling the printing bottom plate to move in a direction towards the storage unit for base plates so that a base plate stored in the storage unit and being in contact with a bottom of the storage unit slides onto the printing bottom plate; and
   controlling the printing bottom plate to move in a direction away from the storage unit for base plates so that the base plate slid onto the printing bottom plate is driven to a preset working position by the printing bottom plate.

18. The method according to claim 17, wherein the step of controlling the printing bottom plate to move in a direction towards the storage unit for base plates base plate stored in the storage unit and being in contact with a bottom of the storage unit slides onto the printing bottom plate comprises:
   controlling the printing bottom plate to move in the direction towards the storage unit for base plates so that the base plate stored in the storage unit and being in contact with a bottom of the storage unit at least partially slides onto the printing bottom plate; and
   controlling the printing bottom plate to reciprocate at least once to get close to or away from the storage unit for base plates, so that the base plate partially slid onto the printing bottom plate slides completely onto the printing bottom plate.

19. The method according to claim 18, wherein the step of controlling the printing bottom plate to reciprocate at least once to get close to or away from the storage unit for base plates, so that the base plate partially slid onto the printing bottom plate slides completely onto the printing bottom plate comprises:
   controlling the printing bottom plate to drive the base plate partially slid onto the printing bottom plate to move in the direction away from the storage unit for base plates; and
   controlling, when it is detected that the base plate partially slid onto the printing bottom plate completely slides out of the storage unit for base plates, the printing bottom plate to move in the direction towards the storage unit for base plates, so that a current base plate in the storage unit in contact with the bottom of the storage unit pushes the base plate partially slid onto the printing bottom plate to slide completely onto the printing bottom plate.

20. The method according to claim 17, wherein the 3D printing bottom plate system further comprises a first limit switch and a sensor stopper block; the first limit switch generates a signal when the printing bottom plate moves into contact with the storage unit for base plates, the sensor stopper block is disposed in the storage unit for base plates, and when flipped up, the sensor stopper block prevents the base plate at least partially slid onto the printing bottom plate from moving in a direction of sliding into the storage unit for base plates; and the step of controlling the printing bottom plate to reciprocate at least once to get close to or away from the storage unit for base plates, so that the base plate partially slid onto the printing bottom plate slides completely onto the printing bottom plate comprises:

controlling the printing bottom plate to drive the base plate partially slid onto the printing bottom plate to move in the direction away from the storage unit for base plates, so that the base plate partially slid onto the printing bottom plate is driven by the printing bottom plate to move until no longer pressing the sensor stopper block;

controlling, upon detection of the signal triggered when the sensor stopper block is flipped up, the printing bottom plate to move in the direction towards the storage unit for base plates, so that the base plate partially slid onto the printing bottom plate continues to slide onto the printing bottom plate due to being blocked by the flipped up sensor stopper;

controlling, upon detection of the signal generated by the first limit switch, the printing bottom plate to drive the base plate partially slid onto the printing bottom plate to move in the direction away from the storage unit for base plates, so that the base plate partially slid onto the printing bottom plate is driven by the printing bottom plate to completely leave the storage unit for base plates, and other base plates stored in the storage unit for base plates fall and press the sensor stopper block; and controlling, upon the detection of the sensor stopper block being pressed, the printing bottom plate to drive the base plate partially slid onto the printing bottom plate to move in the direction towards the storage unit for base plates, so that a current base plate in the storage unit in contact with the bottom of the storage unit pushes the base plate partially slid onto the printing bottom plate to slide completely onto the printing bottom plate.

* * * * *